United States Patent
Elbaz

(10) Patent No.: US 7,766,396 B1
(45) Date of Patent: Aug. 3, 2010

(54) LIQUID TIGHT COUPLING FOR NON-METALLIC CONDUIT

(75) Inventor: Shimon Elbaz, Rockaway Park, NY (US)

(73) Assignee: Superflex Ltd., Brookklyn, NY (US)

( * ) Notice: Subject to any disclaimer, the term of this patent is extended or adjusted under 35 U.S.C. 154(b) by 297 days.

(21) Appl. No.: 10/833,218

(22) Filed: Apr. 28, 2004

(51) Int. Cl.
*F16L 21/00* (2006.01)

(52) U.S. Cl. .................................. 285/397; 285/151.1

(58) Field of Classification Search ............... 285/370, 285/397, 423, 151.1
See application file for complete search history.

(56) References Cited

U.S. PATENT DOCUMENTS

| | | |
|---|---|---|
| 48,709 A | 7/1865 | Emory |
| 585,014 A | 6/1897 | Wenzel |
| 763,010 A | 11/1903 | Meredith |
| 786,507 A | 2/1904 | Mann |
| 815,990 A | 3/1906 | Ward |
| 928,237 A | 7/1909 | Baird |
| 2,468,338 A | 8/1944 | MacWilliam |
| 3,032,358 A * | 5/1962 | Rolston ................... 285/247 |
| 3,955,834 A | 5/1976 | Ahlrot |
| 4,453,749 A * | 6/1984 | McKinnon ................. 285/4 |
| 4,485,668 A * | 12/1984 | Hudson et al. ........... 73/40.5 A |
| 4,597,594 A | 7/1986 | Kacalieff |
| 4,749,217 A * | 6/1988 | Causby et al. ............. 285/245 |
| 5,240,228 A * | 8/1993 | Silveri .................... 254/134.4 |
| 5,507,535 A | 4/1996 | McKamey |
| 6,158,784 A | 12/2000 | Lavender |
| 6,676,173 B2 | 1/2004 | Donnelly |
| 6,899,355 B2 * | 5/2005 | Klein et al. ............... 285/239 |

* cited by examiner

*Primary Examiner*—Aaron Dunwoody
(74) *Attorney, Agent, or Firm*—Seth Natter; Natter & Natter

(57) ABSTRACT

A coupling for non-metallic flexible electrical conduit is formed of a one piece lightweight molded thermoplastic cylindrical sleeve having a pair of threads extending inwardly toward opposite ends. Spaced axially inwardly from the inner end of each thread is an annular sealing ring having a sloped leading face and a perpendicular trailing face with the faces intersecting at a sharp annular edge. Lengths of conduit are engaged over opposite ends of the coupling and rotated to advance the conduit lengths over the sleeve. A liquid tight engagement is effective between each conduit length and the coupling when the conduit length advances past the sealing ring.

18 Claims, 1 Drawing Sheet

LIQUID TIGHT COUPLING FOR NON-METALLIC CONDUIT

BACKGROUND OF THE INVENTION

1. Field of the Invention

This invention relates generally to electrical wiring installations and more particularly to a liquid tight coupling for splicing lengths of non-metallic electrical conduit.

2. Antecedents of the Invention

Various types of couplings have been proposed heretofore for use in conjunction with non-metallic electrical conduit. Due to deficiencies in construction, cost, or labor considerations, it was often more feasible to select or cut a conduit length to the exact size needed, rather than to splice lengths of conduit for a specific electrical installation. This practice resulted in unnecessary excess scrap which required environmentally sound disposal.

It has been generally found that couplings having compression type fittings were unsuitable for use in splicing lengths of non-metallic electrical conduit, due to the multiplicity of parts as well as material and labor costs involved in effecting a splice. Push type couplings formed of a plurality of annular barbs were also found unsuitable, due to deficiencies in joint tensile strength.

There was a need, therefore, for a low cost, one-piece, lightweight coupling for non-metallic electrical conduit which would be both simple to use and provide ample resistance to separation.

SUMMARY OF THE INVENTION

In compendium, the invention comprises a coupling for non-metallic electrical conduit formed of a one piece lightweight molded thermoplastic cylindrical sleeve having a thread extending inwardly from adjacent each end toward a central radial flange.

Spaced axially inwardly from the inner end of each thread is an annular sealing ring with a sloped leading face and a perpendicular trailing face. The leading and trailing faces intersect at a sharp annular edge.

The ends of lengths of conduit are engaged on opposed ends of the coupling. Rotation of the coupling relative to each conduit length advances the respective conduit length over the sleeve, along the thread, and toward the radial flange. When the end of the conduit length advances past the sealing ring, a liquid tight engagement which resists separation due to tensile force and/or rotation is effected between the conduit and the coupling.

From the foregoing compendium, it will be appreciated that it is an aspect of the present invention to provide a liquid tight coupling for non-metallic flexible conduit of the general character described which is not subject to the disadvantages of the antecedents of the invention aforementioned.

A feature of the present invention is to provide a liquid tight coupling for non-metallic flexible conduit of the general character described which is simple to use.

A consideration of the present invention is to provide a liquid tight coupling for non-metallic flexible conduit of the general character described which provides a high tensile strength engagement between joined lengths of conduit for resistance against separation.

Another aspect of the present invention is to provide a liquid tight coupling for non-metallic flexible conduit of the general character described which is relatively low in cost.

To provide a liquid tight coupling for non-metallic flexible conduit of the general character described which is readily adapted for economical mass production fabrication is another feature of the present invention.

A still further consideration of the present invention is to provide a liquid tight coupling for non-metallic flexible conduit of the general character described which is formed of one-piece unitary construction.

To provide a liquid tight coupling for non-metallic flexible conduit of the general character described which effects a liquid tight splice between joined lengths of conduit without the need for sealing rings or gaskets is another aspect of the present invention.

Another feature of the present invention is to provide a system of the general character described for quickly splicing lengths of non-metallic flexible conduit.

A still further feature of the present invention is to provide a liquid tight coupling for non-metallic electrical conduit of the general character described which is well suited for joining a single length of conduit to a component of an electrical installation.

Other aspects, features and considerations of the present invention in part will be obvious and in part will be pointed out hereinafter.

With these ends in view, the invention finds embodiment in certain combinations of elements, arrangements of parts and series of steps by which the aforesaid aspects, features and considerations and certain other aspects, features and considerations are attained, all with reference to the accompanying drawings and the scope of which will be more particularly pointed out and indicated in the appending claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
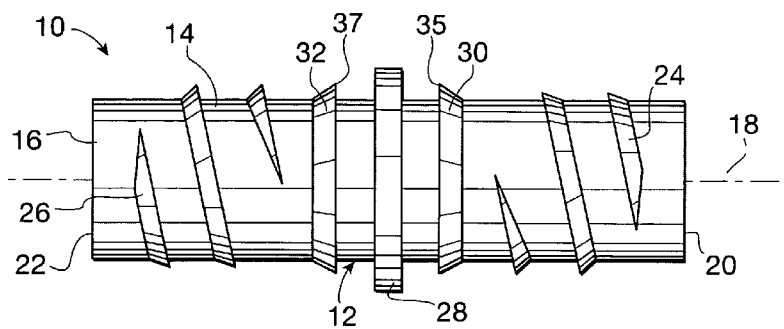
FIG. 1 is an elevational view of a liquid tight coupling for non-metallic electrical conduit constructed in accordance with and embodying the invention and illustrating a sleeve have a thread extending inwardly from adjacent each end toward a central radial flange and a sealing/retention ring spaced inwardly from the inner end of each thread.
Figure 2:
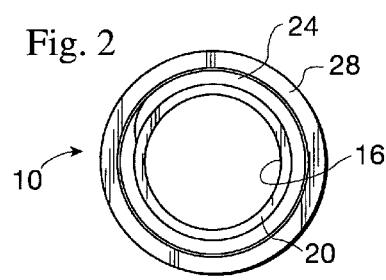
FIG. 2 is a right end elevational view of the coupling.

Referring now in detail to the drawings, the reference numeral 10 denotes generally a coupling for non-metallic electrical conduit constructed in accordance with and embodying the invention. The coupling 10 is unitarily formed of a one piece body 12 which is preferably injection molded of a light weight durable thermoplastic, e.g. rigid polyvinyl chloride. The sleeve 14 includes a hollow cylindrical bore 16 having a longitudinal axis 18 and a pair of axial open ends 20, 22.

Extending inwardly along the periphery of the sleeve from a starting point adjacent the sleeve ends 20, 22 are a pair of self-tapping buttress threads, 24, 26 respectively. Each thread 24, 26 extends toward a central radial flange 28 which lies in a plane perpendicular to the axis 18 and spaced equidistantly from the longitudinal ends 20, 22. The coupling 10 is symmetrical about the plane of the radial flange 28.

Axially spaced from the inner end of the buttress thread 24 is an annular sealing ring 30, while axially spaced from the inner end of the buttress thread 26 is a sealing ring 32. Each sealing ring 30, 32 circumscribes the periphery of the sleeve 14 and lies in a plane transverse to the axis 18.

Pursuant to the invention, a liquid tight spliced section of conduit comprising a length 34 of flexible non-metallic electrical conduit and a different length 36 of flexible non-metallic electrical conduit are joined by the coupling 10. An end of each length 34, 36 is slipped over the end 20, 22 respectively of the cylindrical sleeve 14. Accordingly, the sleeve is dimensioned to be fitted into a bore 38 of the conduit length 34 and a bore 40 of the conduit length 36.

Upon contact between the conduit length 34 and the buttress thread 24 and/or the conduit length 36 and the buttress thread 26, both conduit lengths and/or a single conduit length and the coupling 10 are rotated deasil relative to one another. The buttress threads 24, 26 are configured to aggressively bite into the yieldable bores 38, 40 respectively and draw the respective conduit lengths over the sleeve 14 and toward the radial flange 28.

Whether the conduit lengths are said to move relative to the coupling and/or each other and whether the conduit lengths 34, 36 separately or simultaneously engage the coupling 10 is immaterial to the invention and should be construed alternatively and/or conjunctively.

Figure 3:
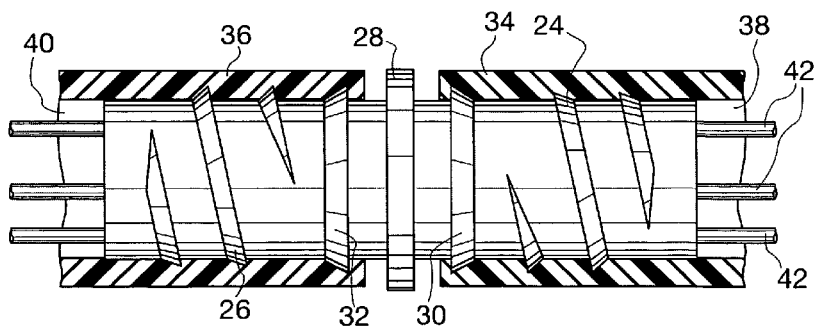
FIG. 3 is a longitudinal sectional view through two spliced lengths of non-metallic electrical conduit, with each conduit length being in liquid tight sealing engagement with the coupling.

Rotation of the conduit lengths relative to the coupling continues until the end of each conduit length 34, 36 is drawn beyond the inner ends of the respective buttress threads 24, 26 and over the annual sealing rings 30, 32 respectively, as illustrated in FIG. 3.

A complete seal is effected upon the conduit lengths passing over the sealing rings 30, 32 without the necessity of the ends of the conduit lengths abutting the radial flange 28. Further, it is unnecessary for the ends of the conduit lengths to be cut square, since the seal is not effected by engagement with the ends of the conduit lengths.

After effecting the splice between the conduit lengths 34, 36, a number of conventional electrical leads 42 may be drawn through the respective conduit lengths and the bore 16 of the sleeve 14 as may be required for the electrical installation.

As will be noted from an examination of FIG. 1, the buttress threads 24, 26 have an aggressive leading face slope in the order for approximately 30°. For ½ inch (1.27 cm) and ¾ inch (1.90 cm) conduit, the height of the threads 24, 26 extending beyond the periphery of the sleeve 24 is in the order of .7 mm to 1.0 mm, with a preferred height of 0.8 mm and the pitch of the threads 24, 26 is in the order of 5.0 mm.

It should be additionally noted that the sealing rings 30, 32 are provided with a conical leading face slope in the order of approximately 30° and a planar trailing face which is perpendicular to the longitudinal axis 18. The intersection of the leading face and trailing face is defined by a sharp annular edge 35, 37 which is spaced radially from the sleeve 14 a minimum distance equal to the thread height and preferably greater.

The conduit lengths 34, 36 comprise lengths of conventional non-metallic flexible liquid tight electrical conduit having a non-metallic helical reinforcing core such as non-metallic liquid tight Type B. Such conduit may be fabricated by extrusion of a flexible polyvinyl chloride over a rigid polyvinyl chloride helix core.

The relatively soft polyvinyl chloride, which defines the conduit bores 38, 40, easily deforms as the conduit lengths are advanced over the threads and the sealing rings 30, 32 bite into and tightly engage and seal the respective conduit lengths.

The configuration of the sealing rings 30, 32, retards removal of the conduit lengths from the coupling by rotation since the sealing rings engage the conduit lengths at the sharp annular edge 35, 37 and along a trailing face which is perpendicular to the axis 18. Further, separation of the conduit lengths 26 by counterclockwise rotation is impeded by the perpendicular trailing faces of the buttress threads 24, 26 as well as the perpendicular trailing face and the sharp annular edge 35, 37 of the sealing rings 30, 32.

Thus is will be seen that there is provided a liquid tight coupling for non-metallic conduit which achieves the various aspects, features and considerations of the present invention and which is well suited to meet the conditions of practical usage.

Since various possible embodiments might be made of the present invention and since various changes might be made in the exemplary embodiment shown herein without departing from the spirit of the invention, it should be understood that all matter herein described or shown in the accompanying drawings is to be interpreted as illustrative and not in a limiting sense.

Having thus described the invention, there is claimed as new and desired to be secured by Letters Patent:

1. A liquid tight spliced section of flexible non-metallic electrical conduit, the spliced section including a coupling, the coupling comprising a one-piece molded thermoplastic body, the body including a sleeve having a longitudinal axis, a cylindrical surface with a uniform diameter, a pair of opposed axial ends comprising a first end and a second end, a first thread extending axially along the sleeve from the first end, a second thread extending axially along the sleeve from the second end, both threads projecting radially from the cylindrical surface, each thread having an inner end, the sleeve further including a first annular sealing ring projecting radially from the cylindrical surface and being spaced axially from the inner end of the first thread, the cylindrical surface being free of radial projections between the inner end of the first thread and the first annular sealing ring, a second annular sealing ring projecting radially from the cylindrical surface and being spaced axially from the inner end of the second thread, the cylindrical surface being free of radial projections between the inner end of the second thread and the second annular sealing ring, each sealing ring having a sloped leading face and a trailing face, the trailing face of each sealing ring lying in a plane perpendicular to the longitudinal axis, the trailing face and the leading face of each sealing ring intersecting at a sharp annular edge, the spliced section of non-metallic electrical conduit comprising a first length of flexible non-metallic electrical conduit having a bore and a second length of flexible non-metallic electrical conduit having a bore, the bore of the first length being positioned over the first thread and the first sealing ring with the sharp annular edge of the first sealing ring engaging the bore and sealing the first length to the coupling to preclude the entry of liquids and moisture into the bore of the first length, the bore of the second length being positioned over the second thread and the second sealing ring with the sharp annular edge of the second sealing ring engaging the bore and sealing the second length to the coupling to preclude the entry of liquids and moisture into the bore of the second length, a portion of the bore of the first length in registration with a portion of the cylindrical surface of the sleeve between the inner end of the first thread and the first annular sealing ring being free to deflect radially inwardly toward the cylindrical surface, a further portion of the bore of the first length in registration with a further portion of the cylindrical surface spaced axially from the trailing face of first annular sealing ring being free to deflect radially inwardly toward the cylindrical surface, a portion of the bore of the second length in registration with a portion of the cylindrical surface of the sleeve between the inner end of the second thread and the second annular sealing ring being free to deflect radially inwardly toward the cylindrical surface, a further portion of the bore of the second length in registration with a portion of the cylindrical surface spaced axially from the trailing face of the second annular sealing ring being free to deflect radially inwardly toward the cylindrical surface, the section further including at least one electrical lead extending through the first length, through the coupling and through the second length whereby at least one electrical lead is maintained free from contact with liquids and moisture whereby the at least one electrical lead is maintained free of contact with liquids and moisture.

2. A liquid tight spliced section of flexible non-metallic electrical conduit as constructed in accordance with claim 1 wherein the coupling body is symmetric about a plane transverse to the longitudinal axis and equidistantly spaced from the axial ends.

3. A liquid tight spliced section of flexible non-metallic electrical conduit as constructed in accordance with claim 1 wherein the threads comprise buttress threads, whereby a high tensile strength splice is attained.

4. A liquid tight spliced section of flexible non-metallic electrical conduit as constructed in accordance with claim 1 further including a flange projecting radially from the cylindrical surface, the flange lying in a plane perpendicular to the longitudinal axis and spaced equidistantly between the first end and the second end.

5. A liquid tight spliced section of flexible non-metallic electrical conduit as constructed in accordance with claim 1 wherein the first thread and the second thread have a thread height in the order of 0.8 mm and a thread pitch in the order of 5.0 mm.

6. A liquid tight spliced section of flexible non-metallic electrical conduit as constructed in accordance with claim 1 wherein the leading face of each sealing ring is at an angle of approximately 30° relative to the longitudinal axis.

7. A liquid tight spliced section of flexible non-metallic electrical conduit as constructed in accordance with claim 1 wherein the first thread and the second thread have the same thread height, the sharp annular edge being spaced from the sleeve a radial distance at least as great as the thread height.

8. A liquid tight spliced section of flexible non-metallic electrical conduit as constructed in accordance with claim 1 wherein the portion of the bore of the first length in registration with the portion of the cylindrical surface between the inner end of the first thread and the first annular sealing ring is in substantially abutting contact with the cylindrical surface and the portion of the bore of the second length in registration with the portion of the cylindrical surface between the inner end of the second thread and the second annular sealing ring is in substantially abutting contact with the cylindrical surface.

9. A liquid tight spliced section of flexible non-metallic electrical conduit as constructed in accordance with claim 8 wherein the portion of the bore of the first length in registration with the portion of the cylindrical surface spaced axially from the trailing face of the first annular sealing ring is in substantially abutting contact with the cylindrical surface and the portion of the bore of the second length in registration with the portion of the cylindrical surface spaced axially from the trailing face of the second annular sealing ring is in substantially abutting contact with the cylindrical surface.

10. A liquid tight spliced section of flexible non-metallic electrical conduit as constructed in accordance with claim 8 wherein the portion of the bore of the first length in registration with the portion of the cylindrical surface between the inner end of the first thread and the first annular sealing ring is in substantially abutting contact with the cylindrical surface and the portion of the bore of the second length in registration with the portion of the cylindrical surface between the inner end of the second thread and the second annular sealing ring.

11. A liquid tight section of flexible non-metallic electrical conduit, the section including a length of flexible non-metallic electrical conduit and a coupling, the coupling comprising a one piece molded thermoplastic body, the body including a sleeve having a longitudinal axis, the sleeve having a cylindrical surface with a uniform diameter suitable for engagement within the length of flexible non-metallic electrical conduit, a buttress thread projecting radially from the cylindrical surface and advancing axially along the sleeve from a first end of the sleeve toward a second end of the sleeve, the thread terminating at a point distant from the second end of the sleeve and an annular sealing ring projecting radially from the cylindrical surface and being axially spaced along the cylindrical surface between the point and the second end of the sleeve, the cylindrical surface being free of radial projections between the point and the sealing ring, the sealing ring having a sloped leading face directed toward the buttress thread and a trailing face directed toward the one end, the trailing face and the leading face intersecting at a sharp annular edge, the length of flexible non-metallic electrical conduit having a bore, the bore being positioned over the first end of the sleeve, the buttress thread and the sealing ring, with the sharp annular edge engaging the bore and sealing the length of conduit to the coupling to preclude entry of liquids and moisture into the bore, a portion of the bore in registration with the portion of the cylindrical surface between the point and the sealing ring being free to deflect radially inwardly toward the cylindrical surface, a portion of the bore in registration with a portion of the cylindrical surface between the trailing face of the sealing ring and the second end of the sleeve being free to deflect radially inwardly toward the cylindrical surface, the liquid tight section further including at least one electrical lead extending through the flexible non-metallic conduit and through the coupling whereby the at least one electrical lead is maintained free from contact with liquids and moisture.

12. A liquid tight section of flexible non-metallic electrical conduit as constructed in accordance with claim 11, wherein the thread is provided with a pitch in the order of 5.0 mm and a thread height in the order of 0.8 mm.

13. A liquid tight section of flexible non-metallic electrical conduit as constructed in accordance with claim 11, wherein the leading face of the sealing ring is sloped in the order of 30° relative to the longitudinal axis.

14. A liquid tight spliced section of flexible non-metallic electrical conduit as constructed in accordance with claim 11 wherein the portion of the bore in registration with the portion of the cylindrical surface between the point and the sealing ring is in substantially abutting contact with cylindrical surface.

15. A method of fabricating the liquid tight spliced section of flexible non-metallic electrical conduit of claim 1, the method comprising the steps of:
 a) selecting first and second lengths of non-metallic flexible electrical conduit to be spliced,
 b) inserting a bore of the first length of flexible non-metallic conduit over the first end of the cylindrical sleeve,
 c) inserting a bore of the second length of flexible non-metallic electrical conduit over the second end of the cylindrical sleeve, d) rotating each length of conduit relative to the sleeve to engage the respective threads and advance the conduit lengths along the sleeve and over the sealing rings, e) deflecting a portion of the bore of the first length in registration with the portion of the cylindrical surface between the inner end of the first thread and the first annular sealing ring radially inwardly toward the cylindrical surface, f) deflecting a portion of the bore of the second length in registration with the portion of the cylindrical surface between the inner end of the second thread and the trailing face of second annular sealing ring radially inwardly toward the cylindrical surface, and g) threading at least one electrical lead through the first length of conduit, through the coupling and through the second length of conduit.

16. A liquid tight section of flexible non-metallic electrical conduit, the section including a coupling, the coupling comprising a one piece molded thermoplastic body, the body including a sleeve having a first end and a second end, the sleeve having a cylindrical surface with a uniform diameter suitable for engagement within the section of flexible non-metallic electrical conduit, a thread projecting radially from the cylindrical surface and advancing axially along the sleeve from the first end of the sleeve, the thread terminating at a point distant from the second end of the sleeve, an annular sealing ring projecting radially from the cylindrical surface and being axially spaced from the point, the cylindrical surface being free of radial projections between the point and the annular sealing ring, the sealing ring having a sloped leading face directed toward the thread and a trailing face, the trailing face and the leading face intersecting at a sharp annular edge, the section of flexible non-metallic electrical conduit having a bore, the bore being positioned over the first end of the sleeve, the buttress thread and the sealing ring, with the sharp annular edge engaging the bore and sealing the section of flexible non-metallic electrical conduit to the coupling to preclude entry of liquids and moisture into the bore, a portion of the bore being in abutting contact with a portion of the cylindrical surface between the point and the annular sealing ring, the liquid tight section further including at least one electrical lead extending through the flexible non-metallic conduit and through the coupling whereby the at least one electrical lead is maintained free of contact with liquids and moisture.

17. A method of fabricating the liquid tight section of flexible non-metallic electrical conduit of claim 16, the method comprising the steps of:

a) selecting a length of non-metallic flexible electrical conduit, b) inserting the bore of the length of flexible non-metallic conduit over the first end of the cylindrical sleeve, c) rotating the length of conduit relative to the sleeve to engage the thread and advance the length of conduit along the sleeve and over the sealing ring, and d) threading at least one electrical lead through the length of conduit and through the coupling.

18. A liquid tight section of flexible non-metallic electrical conduit as constructed in accordance with claim 16, wherein the thread is provided with a pitch in the order of 5.0 mm and a thread height in the order of 0.8 mm.

* * * * *